US012708114B2

(12) United States Patent
Bernardini et al.

(10) Patent No.: US 12,708,114 B2
(45) Date of Patent: Aug. 18, 2026

(54) FUNGICIDE COMPOSITION

(71) Applicant: SIPCAM OXON S.P.A., Milan (IT)

(72) Inventors: Marco Bernardini, Casalpusterlengo (IT); Francesca Borgo, Rho (IT); Cristina Rapetti, Alessandria (IT); Gianluca Valieri, Albalat de la Ribera (ES)

(73) Assignee: SIPCAM OXON S.P.A., Milan (IT)

( * ) Notice: Subject to any disclaimer, the term of this patent is extended or adjusted under 35 U.S.C. 154(b) by 916 days.

(21) Appl. No.: 17/632,951

(22) PCT Filed: Aug. 5, 2020

(86) PCT No.: PCT/IB2020/057377

§ 371 (c)(1),
(2) Date: Feb. 4, 2022

(87) PCT Pub. No.: WO2021/024189

PCT Pub. Date: Feb. 11, 2021

(65) Prior Publication Data

US 2022/0330545 A1 Oct. 20, 2022

(30) Foreign Application Priority Data

Aug. 8, 2019 (IT) ........................ 102019000014445

(51) Int. Cl.
*A01N 25/30* (2006.01)
*A01N 25/04* (2006.01)
*A01N 37/34* (2006.01)
*A01N 43/653* (2006.01)

(52) U.S. Cl.
CPC ............ *A01N 25/30* (2013.01); *A01N 25/04* (2013.01); *A01N 37/34* (2013.01); *A01N 43/653* (2013.01)

(58) Field of Classification Search
None
See application file for complete search history.

(56) References Cited

U.S. PATENT DOCUMENTS

| | | | | |
|---|---|---|---|---|
| 2010/0105669 A1* | 4/2010 | Voeste | A01N 47/24 | 514/342 |
| 2013/0217746 A1* | 8/2013 | Ramsay | A01N 25/04 | 514/406 |
| 2016/0278371 A1* | 9/2016 | Knight | A01N 25/08 | |

FOREIGN PATENT DOCUMENTS

| | | | |
|---|---|---|---|
| CN | 102 885 054 | | 1/2013 |
| CN | 105 707 083 | | 11/2017 |
| CN | 108 770 843 | * | 11/2018 |
| EP | 3 403 504 | * | 11/2018 |
| EP | 3 483 504 | | 5/2019 |
| WO | 2007/031308 | | 3/2007 |
| WO | 2007/115765 | | 10/2007 |
| WO | WO 2009126473 | * | 10/2009 |
| WO | WO 2018/211383 | * | 11/2018 |

OTHER PUBLICATIONS

Sewell et al. "Azole sensitivity in *Leptosphaeria* pathogens of oilseed rape: the role of lanosterol 14a-demethylase" 2017.*
International search report and written opinion issued on Nov. 17, 2020 for PCT/IB2020/057377.

* cited by examiner

*Primary Examiner* — Danah Al-Awadi
(74) *Attorney, Agent, or Firm* — Marietti Gislon e Trupiano Srl; Silvia Salvadori

(57) ABSTRACT

The present invention refers to an aqueous composition comprising prothioconazole, optionally chlorothalonil, and at least one sulfonate surfactant, said composition having a pH<7. The present invention also refers to a production process of said composition, and to the use of the composition in the treatment and/or the prevention of fungal infections in plants.

13 Claims, No Drawings

FUNGICIDE COMPOSITION

This application is a U.S. national stage of PCT/IB2020/057377 filed on 5 Aug. 2020 which claims priority to and the benefit of Italian Application No. 102019000014445 filed on 8 Aug. 2019, the contents of which are incorporated herein by reference in their entireties.

TECHNICAL FIELD

The invention refers to the field of fungicide compositions. In particular, the present invention refers to chemically and physically stable water-based compositions with fungicide activity, and to a process for the production of such compositions.

TECHNICAL BACKGROUND

Several compounds with fungicide activity are known.

Such compounds are generally used in compositions adapted to be used in the agricultural field, to prevent and/or treat fungal infections in plants.

Among the fungicide compositions, compositions comprising prothioconazole are known.

However, it is known that the compositions comprising prothioconazole, in particular the water-based liquid compositions, have stability problems. For example, the Patent Application CA3007969A1 describes that, during storage, in particular in presence of conditions such as high temperatures, incident light and oxygen contact, prothioconazole can undergo degradation, thus generating 2-(1-cyclopropyl)-1-(2-chlorophenyl)-3-(1H-1,2,4-triazol-1-yl) propan-2-ol. In consequence, the amount of prothioconazole, i.e. of the fungicide active ingredient, in the formulation is reduced. CA3007969A1 deals with the problem of providing formulations containing prothioconazole, which have high stability during storage and which do not show any significant degradation of prothioconazole to 2-(1-chlorocyclopropyl)-1-(2-chlorophenyl)-3-(1H-1,2,4-triazol-1-yl)propan-2-ol. In CA3007969A1, such problem is solved by providing liquid formulations comprising prothioconazole and at least one organic solvent, e.g., N,N-dimethyl 9-decenamide (CAS number 1356964-77-6).

However, solvent-based formulates have several disadvantages such as, e.g., high environmental impact, poor handling of the formulated product, both in terms of risk increase for the production operators and for the final user, and the possible toxicological classification of the solvents used as dangerous compounds which could reflect also upon the classification of the formulated product itself.

Fungicide compositions comprising more than one active ingredient, e.g. prothioconazole and chlorothalonil, are known.

The International Application WO2018/210158A1 describes a fungicide composition comprising prothioconazole and chlorothalonil. WO2018/210158A1 deals with the problem of phytotoxicity of such compounds, in particular of chlorothalonil, and teaches that by combining chlorothalonil with prothioconazole a reduction of the phytotoxic effects of both compounds is achieved. WO2018/210158A1 also describes that the combination of prothioconazole and chlorothalonil produces a synergic enhancement of the fungicide activity which, in the combination, is higher than expected by the sum of the activity of the two single compounds.

However, the combination of prothioconazole with other active ingredients does not allow to overcome the instability problem of the composition, in particular of the tendency of prothioconazole to undergo degradation.

There exists therefore the need of providing fungicide compositions, in particular water-based compositions, which are effective and which have both chemical and physical high stability.

SUMMARY OF THE INVENTION

Aim of the present invention is to solve the above discussed problems and to provide a composition having high fungicide activity.

Further aim of the present invention is to provide a composition with fungicide activity which is stable, in particular both chemically stable and physically stable.

Still other aim of the present invention is to provide a fungicide composition having a production process which is easily feasible, also at industrial level, and which allows a good production yield.

These and other aims are achieved by an aqueous composition according to claim 1.

The present invention also refers to a production process of such composition, and to its use in the treatment and/or the prevention of fungal infections in plants.

DETAILED DESCRIPTION

In the following description, the characteristics of the invention will be described referring to exemplary embodiments; however, each of the characteristics herein described can be combined with one or more other characteristics herein described, providing further embodiments of the present invention. Such embodiments must be considered described by the present description.

As mentioned above, an object of the present invention is an aqueous composition comprising prothioconazole, and at least one sulfonate surfactant, said composition having pH≤7.

Advantageously, the composition of the present invention results to be stable over time, both physically and chemically, keeping high fungicide activity.

Indeed, it has been surprisingly observed that an aqueous composition comprising prothioconazole and at least one sulfonate surfactant, having a pH≤7, results to be both physically and chemically stable.

In particular, the composition of the present invention is, advantageously, physically stable, i.e. it maintains substantially unaltered over time the physical characteristics allowing its final use such as, e.g., fluidity, lack of phase separation and lack of sediments.

Moreover, the composition of the present invention is, advantageously, chemically stable, i.e. it does not have a degradation level over time of the active ingredients contained therein (in particular of prothioconazole), such that the antifungal effect of the composition results to be substantially altered or compromised.

Prothioconazole, having IUPAC name 2-[2-(1-chorocyclopropyl)-3-(2-chlorophenyl)-2-hydroxypropyl]-2,4-dihydro-1,2,4-triazole-3-thione, is a synthetic compound, per se known, of the triazole class. Prothioconazole is a systemic fungicide, which can be absorbed by the plant, e.g. by the roots and/or the leaves, and be then distributed within the plant.

Optionally, the composition according to the present invention can include at least a second compound with antifungal activity, chlorothalonil.

Chlorothalonil, having IUPAC name tetrachloroisophthalonitrile, belongs to the class of chloronitriles. Chlorothalonil is a non-systemic fungicide, i.e. it is not absorbed by the plant but it acts on the fungi which are located on the plant surface.

In embodiments, the aqueous composition of the invention has pH≤7 and comprises prothioconazole, chlorothalonil, and at least one sulfonate surfactant.

In embodiments, the composition has pH≤5, preferably ≤3.5, more preferably between 2 and 3.5. Preferably the pH of the composition remains substantially constant over time, i.e. a pH variation remains within one pH unit, preferably 0.5 pH units. For example, an initial pH of 2.0 will not exceed the value of 3.0 (or will not fall below 1.0), preferably it will not rise above 2.5 (or will fall below 1.5).

In embodiments, the composition can have pH≤3.

In embodiments, the composition of the invention can comprise at least one acid selected from inorganic acids, organic acids and mixtures thereof.

In other words, in embodiments, the composition can comprise prothioconazole, optionally chlorothalonil, one or more sulfonate surfactants and one or more acids.

The acids which can be used in the composition of the invention can be one or more inorganic acids, one or more organic acids, or a combination of one or more inorganic acids and one or more organic acids.

Advantageously, when the composition of the invention comprises one or more acids, the composition results to be particularly stable, both physically and chemically, even for long periods.

In embodiments, when the composition comprises one or more acids, the pH of the composition is preferably ≤3.5, more preferably between 2 and 3.5. In embodiments, the composition can have pH≤3.

Moreover, it has been surprisingly observed that, advantageously, when the composition comprises one or more acids, the pH of the composition remains substantially constant over time, even for long periods.

In embodiments, one or more inorganic acids, which can be used in the composition of the invention, can be selected from sulfuric acid, phosphoric acid, hydrochloric acid, hydrobromic acid, hydroiodic acid, hydrofluoric acid, hydroastatic acid, hydrogen sulfide, hydrogen selenide, hydrogen telluride, hydrazoic acid, hydrogen cyanide, boric acid, carbonic acid, nitrous acid, nitric acid, hypophosphorous acid, phosphorous acid, pyrophosphoric acid, sulfurous acid, hypochlorous acid, chlorous acid, chloric acid, perchloric acid, iodic acid and mixtures thereof.

In embodiments, the composition of the invention can comprise one or more acids selected from sulfuric acid, phosphoric acid, hydrochloric acid, and mixtures thereof.

In embodiments, one or more organic acid, which can be used in the composition of the invention, can be selected from carboxylic acids, peroxyacids, sulfonic acids, sulfinic acids, sulfenic acids, phosphonic acids and mixtures thereof. For example, one or more organic acids can be selected from citric acid, acrylic acid, adipic acid, aldaric acid, oxalic acid, phthalic acid, azelaic acid, sebacic acid, isocitric acid, butyric acid, oleic acid, palmitic acid, stearic acid, glutamic acid, aspartic acid, acetoacetic acid, pyruvic acid, levulinic acid, benzoic acid, salicylic acid, cinnamic acid, caffeic acid, glycolic acid, lactic acid, salicylic acid, gentisic acid and mixtures thereof. In an embodiment, the composition of the invention comprises citric acid.

In embodiments, the composition of the invention comprises prothioconazole, optionally chlorothalonil, at least one sulfonate surfactant, and at least one acid selected from sulfuric acid, phosphoric acid, hydrochloric acid, citric acid and mixtures thereof.

As mentioned above, the composition of the invention includes at least one sulfonate surfactant. In embodiments, the composition includes a plurality of sulfonate surfactants.

Sulfonate surfactants, which can be used in the composition of the invention, are, per se known in the art and commercially available.

In embodiments, one or more sulfonate surfactants, which can be used in the composition of the invention, can be selected from alkylsulfonates, alkylarylsulfonates, diphenylsulfonates, alpha-olefinsulfonates, lignosulfonates, sulfonates of fatty acids, sulfonates of alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates, sulfosuccinamates and mixtures thereof.

In embodiments, the composition of the invention can comprise one or more sulfonate surfactants selected from alkylnaphthalenesulfonates, lignosulfonates and mixtures thereof.

In embodiments, the composition of the invention can comprise one or more sulfonate surfactants selected from alkylnaphthalenesulfonates, lignosulfonates, alkylarylsulfonates and mixtures thereof.

In embodiments, the composition of the invention includes at least one alkylnaphthalenesulfonate surfactant and at least one lignosulfonate surfactant, preferably at least one methylnaphthalenesulfonate surfactant and at least one lignosulfonate surfactant.

In embodiments, the composition of the invention includes at least one alkylnaphthalenesulfonate surfactant, at least one lignosulfonate surfactant, and at least one alkylarylsulfonate surfactant.

For example, in embodiments, the composition of the invention can comprise prothioconazole, optionally chlorothalonil, one methylnaphthalenesulfonate surfactant, one lignosulfonate surfactant, and optionally one or more acids, e.g. sulfuric acid and/or phosphoric acid and/or hydrochloric acid and/or citric acid.

In embodiments, the composition of the invention can further comprise at least one non-sulfonate surfactant.

In embodiments, the amount by weight of prothioconazole is between 1% and 50%, preferably between 2% and 45%, more preferably between 2% and 40%, relative to the total weight of the composition.

In embodiments, the amount by weight of prothioconazole is between 1% and 50%, preferably between 2% and 30%, more preferably between 2% and 20%, relative to the total weight of the composition.

When the composition of the invention comprises chlorothalonil, the amount by weight of chlorothalonil is preferably between 1% and 55%, more preferably between 10% and 55%, still more preferably between 20% and 55% relative to the total weight of the composition.

According to an aspect, the composition of the invention comprises at least one sulfonate surfactant. In embodiments, the amount by weight of said at least one sulfonate surfactant is preferably between 0.5% and 25%, more preferably between 2% and 15%, still more preferably between 4% and 10%, relative to the total weight of the composition.

When the composition of the invention comprises a plurality of sulfonate surfactants, the total amount by weight of sulfonate surfactants is preferably between 0.5% and 25%, more preferably between 2% and 15%, still more preferably between 4% and 10%, relative to the total weight of the composition.

In embodiments, in the composition according to the invention, the concentration of said prothioconazole can be in the range between 10 g/l and 600 g/l, preferably between 20 g/l and 500 g/l, more preferably between 30 g/l and 450 g/l. In embodiments, the concentration of prothioconazole can be about 400 g/l.

In embodiments, in the composition according to the invention, the concentration of said prothioconazole can be in the range between 10 g/l and 500 g/l, preferably between 20 g/l and 250 g/l, more preferably between 30 g/l and 200 g/l.

In embodiments, the concentration of prothioconazole can be, e.g., in the range between 50 g/l and 300 g/l, in the range between 75 g/l and 200 g/l or in the range between 100 g/l and 200 g/l.

In other embodiments, the concentration of prothioconazole can be, e.g., in the range between 10 g/l and 100 g/l, in the range between 20 g/l and 80 g/l or in the range between 30 g/l and 60 g/l.

In embodiments, when the composition according to the present invention includes chlorothalonil, the concentration of chlorothalonil can be in the range between 100 g/l and 700 g/l, preferably between 200 g/l and 700 g/l, more preferably between 300 g/l and 700 g/l.

In embodiments, the concentration of chlorothalonil can be, e.g., in the range between 200 g/l and 600 g/l, in the range between 250 g/l and 500 g/l or in the range between 300 g/l and 400 g/l.

In other embodiments, the concentration of chlorothalonil can be, e.g., in the range between 300 g/l and 700 g/l, in the range between 400 g/l and 700 g/l or in the range between 500 g/l and 700 g/l.

For example, the composition of the invention can comprise prothioconazole in a concentration in the range between 100 g/l and 200 g/l and chlorothalonil in a concentration in the range between 300 g/l and 400 g/l.

For example, the composition of the invention can comprise prothioconazole in a concentration in the range between 30 g/l and 60 g/l and chlorothalonil in a concentration in the range between 500 g/l and 700 g/l.

According to an aspect, the composition of the invention is an aqueous composition.

In embodiments, the composition is an aqueous suspension, preferably an aqueous suspension concentrate (SC). The above stated percentages refer to a concentrated aqueous composition; the suspension concentrate is typically diluted at the moment of use.

In agricultural field the use of compositions containing one or more active ingredients, in form of aqueous suspensions, in particular of aqueous suspension concentrates (SC), is per se known.

In general, the aqueous suspensions are liquid formulations wherein the active ingredient (or the active ingredients) is suspended in water, optionally micronized (e.g. in the form of particles having size between 1 μm and 6 μm). Optionally, the aqueous suspensions can further include one or more components selected from surfactants, dispersants, antifreezes, defoamers, antibacterials and/or anti-molds (i.e. biocides), and thickeners.

In embodiments, the composition according to the present invention can comprise one or more antifreezes, and/or one or more dispersants, and/or one or more defoamers, and/or one or more biocide agents, and/or one or more thickeners.

Antifreezes which can be used in the composition of the invention are per se known and commercially available. For example, antifreezes which can be used in the composition of the invention are glycols, e.g. monopropylene glycol (MPG).

Dispersants which can be used in the composition of the invention are per se known and commercially available. For example, dispersants which can be used in the composition of the invention are alkylnaphthalenesulfonates and lignosulfonates.

Defoamers which can be used in the composition of the invention are per se known and commercially available. For example, defoamers which can be used in the composition of the invention are silicone defoamers.

Biocide agents, e.g. antibacterials and anti-molds, which can be used in the composition of the invention, are per se known and commercially available. In general, biocide agents can be added to the aqueous compositions comprising active ingredients, for agricultural use, in order to prevent the contamination of such compositions from bacteria and/or molds. For example, biocides which can be used in the composition of the invention are the compounds belonging to the class of benzisothiazolinones.

Thickeners which can be used in the composition of the invention are per se known and commercially available. For example, thickeners which can be used in the composition of the invention are natural gums, such as for example xanthan gum, guar gum, acacia gum (or gum arabic), gum karaya, tara gum, gellan gum and mixtures thereof.

In embodiments, the composition of the invention can further comprise one or more non-sulfonate surfactants. In other words, in embodiments the composition can comprise, in addition to at least one sulfonate surfactant, one or more non-sulfonate surfactants, i.e. which do not belong to the class of sulfonate surfactants.

The composition of the present invention can be prepared by means of a process comprising a step of mixing prothioconazole, optionally chlorothalonil, and at least one sulfonate surfactant, in water.

Further object of the present invention is a process for the preparation of the composition of the invention, such process comprising a step of mixing prothioconazole, optionally chlorothalonil, and at least one sulfonate surfactant, in water.

According to an aspect, the composition has pH≤7, preferably has pH≤5, more preferably has pH≤3.5, and still more preferably has pH between 2 and 3.5.

In embodiments, the composition can have pH≤3.

According to embodiments, the process according to the present invention comprises a step of adding at least one acid selected from inorganic acids, organic acids and mixtures thereof. In this case, advantageously, it is possible to regulate the pH of the composition to a specific value, which can be optionally preselected. Moreover, as discussed above, it has been surprisingly observed that, advantageously, when the composition comprises one or more acids, the pH of the composition remains substantially constant over time, also for long periods, and the composition results to be particularly stable, both physically and chemically.

In embodiments, the process of the invention can comprise a step of micronizing the composition. As mentioned above, the step of micronizing the composition allows to reduce the particle size of prothioconazole and optionally, of chlorothalonil within the composition, to an average size (i.e. average diameter) which can be, for example, between 1 μm and 10 μm.

Micronization is a process per se known and can be carried out by means of known techniques. For example, the micronization of aqueous compositions, in particular of aqueous suspensions preferably concentrated, can be carried out by using a wet pan mill, e.g. the Dyno® Mill wet pan mill with micro-balls.

In embodiments, the process of the invention can further comprise one or more steps of adding one or more antifreezes, and/or one or more dispersants, and/or one or more defoamers, and/or one or more biocide agents, and/or one or more thickeners.

Still object of the present invention is the use of a composition according to the invention in the treatment and/or the prevention of fungal infections in plants.

Advantageously, the composition of the present invention can be produced in concentrated form, e.g. in form of aqueous suspension concentrate (SC), and can be diluted with water at the moment of its application to the plant.

For example, the composition of the invention can be diluted in water, obtaining a diluted composition wherein the composition of the invention is in an amount in the range between 0.05 wt % and 10 wt %, preferably between 0.1 wt % and 7 wt %, more preferably between 0.15 wt % and 5 wt % relative to the total weight of the diluted composition. For example, the composition of the invention can be diluted in water, obtaining a diluted composition wherein the composition of the invention is in an amount in the range between 0.2 wt % and 4.25 wt %, relative to the total weight of the diluted composition.

The composition of the invention, properly diluted, can be provided to the plants according to per se known techniques in the agrochemical field. For example, the composition according to the invention, optionally diluted, can be provided to the plants or to one or more parts thereof, by means of known spraying techniques.

As mentioned above, the composition of the invention has several advantages with respect to the compositions known in the art.

In particular, the composition of the invention has high physical and chemical stability. For this reason, the composition of the invention can be stored and conserved, also for long periods, without substantially undergoing physical and/or chemical alterations which compromise the application and/or the effectiveness in the treatment and prevention of fungal infections.

Moreover, the composition of the invention can comprise, in addition to prothioconazole, at least one second active ingredient with antifungal activity, i.e. chlorothalonil. In this case, the composition results to be particularly effective in the treatment and/or the prevention of fungal infections in plants.

The invention will be described in more detail in the following Experimental Section, by way of example only and without limitation.

EXPERIMENTAL SECTION

Example 1A—Preparation of Compositions Comprising Prothioconazole and Chlorothalonil Eight different compositions in the form of aqueous suspension concentrates (SC) have been prepared by means of the process steps hereinafter described:

a) To a suitable amount of water, preferably under stirring, an antifreeze (MPG), the surfactants present (Morwet® D-425; Ultrazine Na; Soprophor® 3D33), an aliquot of defoamer (Defomex 1510) and the optional amount of intended acid are added; the different components are mixed by using a high shear mixer, e.g. an Ultra Turrax mixer, until obtaining an homogeneous mixture;

b) The active ingredients (prothioconazole and chlorothalonil), preferably one at time, are added; after the addition of each active ingredient mixing is performed until obtaining an homogeneous suspension, by using a high shear mixer, such as Ultra Turrax;

c) the obtained suspension is micronized by means of a wet pan mill, e.g. a Dyno® Mill with micro-balls;

d) to the micronized suspension a thickener (Rhodopol® 23, previously dispersed in water at 2.7% to form a pregel), an antibacterial (Proxel® GXL) and the remaining amount of defoamer (Defomex 1510) are added.

Optionally, additional water can be added in order to obtain a composition having the desired concentration of the different components.

In Table 1A, hereinafter reported, are set forth in detail the components and their amounts (expressed as weight/weight percentages relative to the total weight of the composition) in the different compositions obtained according to the just described process.

TABLE 1A

| | COMPOSITIONS | | | | | | | |
|---|---|---|---|---|---|---|---|---|
| COMPONENTS (% W/W) | 1<br>% | 2<br>% | 3<br>% | 4<br>% | 5<br>% | 6<br>% | 7<br>% | 8<br>% |
| Chlorothalonil (98% purity) | 28.80 | 28.80 | 28.80 | 28.80 | 28.80 | 28.80 | 28.80 | 28.80 |
| Prothioconazole (98.1% purity) | 12.33 | 12.33 | 12.33 | 12.33 | 12.33 | 12.33 | 12.33 | 12.33 |
| Morwet D-425 | 4.00 | 4.00 | 4.00 | 4.00 | 4.00 | — | — | 4.00 |
| Ultrazine Na | 2.00 | 2.00 | 2.00 | 2.00 | 2.00 | — | — | 2.00 |
| Soprophor 3D33 | — | — | — | — | — | 3.50 | 3.50 | 3.50 |
| MPG | 5.00 | 5.00 | 5.00 | 5.00 | 5.00 | 5.00 | 5.00 | 5.00 |
| 1M Sulfuric acid | — | 1.50 | — | — | — | — | 1.50 | — |
| Citric acid | — | — | 2.00 | — | — | — | — | — |
| Phosphoric acid (50% sol.) | — | — | — | 0.75 | — | — | — | — |
| Hydrochloric acid (50% sol.) | — | — | — | — | 0.50 | — | — | — |
| Defomex 1510 | 0.10 | 0.10 | 0.10 | 0.10 | 0.10 | 0.10 | 0.10 | 0.10 |
| Proxel GXL | 0.10 | 0.10 | 0.10 | 0.10 | 0.10 | 0.10 | 0.10 | 0.10 |
| Rhodopol 23 2.7% | 6.50 | 10.00 | 7.00 | 7.00 | 7.00 | 8.00 | 8.00 | 5.00 |
| Water | 41.17 | 36.17 | 38.67 | 39.92 | 40.17 | 42.17 | 40.67 | 39.17 |
| total | 100.00 | 100.00 | 100.00 | 100.00 | 100.00 | 100.00 | 100.00 | 100.00 |

The raw materials used for the production of the tested compositions are per se known and commercially available.

The purity degree indicated for prothioconazole and chlorothalonil raw materials are, per se, not limiting for the purposes of the present invention. Moreover, it is known that, in commercial products, a certain fluctuation of such parameter is allowed and acceptable.

The product having the trade name "Morwet® D-425" (AkzoNobel) is an anionic surfactant belonging to the class of alkylnaphthalenesulfonates (in particular methylnaphthalenesulfonate sodium salt), and it is commercially available.

The product having the trade name "Ultrazine Na" (Borregaard Lignotech) is an anionic surfactant belonging to the class of lignosulfonates (in particular lignosulfonates sodium salt), and it is commercially available.

The product having the trade name "Soprophor® 3D33" (Solvay) is an anionic surfactant, specifically a polyarylphenyl ether phosphate, and it is commercially available.

"MPG" is monopropylene glycol, antifreeze commercially available.

The product having the trade name "Defomex 1510" (Lamberti) is a silicone defoamer, and it is commercially available.

The product having the trade name "Proxel® GXL" (Lonza) belongs to the class of benzisothiazolinones (in particular 1,2-benzisothiazolin-3-one), it is used as an antibacterial and is commercially available.

The product having the trade name "Rhodopol® 23" (Solvay) is a xanthan gum-based thickener, and it is commercially available.

Example 1B—Preparation of Compositions Comprising Prothioconazole

Two compositions (compositions 9 and 10) in the form of aqueous suspension concentrates (SC) have been prepared by means of the process steps described in Example 1A. In this case the compositions do not include chlorothalonil.

In Table 1B, hereinafter reported, are set forth in detail the components and their amount (expressed as weight/weight percentages relative to the total weight of the composition) in the different compositions obtained according to the just described process.

TABLE 1B

| COMPOSITIONS COMPONENTS (% W/W) | 9 % | 10 % |
|---|---|---|
| Prothioconazole (98.1% purity) | 35.1 | 35.2 |
| Soprophor 4D384 | 1.00 | 1.00 |

TABLE 1B-continued

| COMPOSITIONS COMPONENTS (% W/W) | 9 % | 10 % |
|---|---|---|
| Morwet D-425 | 4.00 | 4.00 |
| Ultrazine Na | 2.00 | 2.00 |
| MPG | 5.00 | 5.00 |
| 1M Sulfuric acid | 1.50 | — |
| Citric acid | — | 1.50 |
| Defomex 1510 | 0.10 | 0.10 |
| Proxel GXL | 0.10 | 0.10 |
| Rhodopol 23 2.7% | 9.00 | 9.00 |
| Water | 42.2 | 42.1 |
| total | 100.00 | 100.00 |

The raw materials used for the production of the compositions are per se known and are commercially available, as described above.

The product with the trade name "Soprophor® 4D384" (Solvay) is an anionic surfactant belonging to the class of alkylarylsulfonates, specifically a tristyrylphenol sulfate (in particular, poly(oxy-1,2-ethanediyl),α-sulfo-ω-[2, 4, 6-tris (1-phenylethyl)phenoxy], ammonium salt) and it is commercially available.

Example 2—Evaluation of Initial Parameters

For each composition obtained according to Example 1A, the following parameters are evaluated:

pH
appearance (under microscope)
residue 100 mesh (%)
residue 325 mesh (%)
viscosity (cPs).

The pH of the compositions is measured according to per se known techniques, e.g. by using a suitably calibrated pH meter, to measure the pH of the different non-diluted compositions. In particular, the pH of the compositions of the invention has been measured according to the CIPAC MT 75.3 method.

The evaluation of the appearance under the optical microscope allows to observe the crystals, i.e. the prothioconazole and chlorothalonil particles present in the composition, and to visually evaluate their form, size and morphology.

The residue at 100 mesh and 350 mesh (expressed as % of the product which is retained by the mesh of the sieve, with respect to the total amount of analyzed product) can be determined according to the CIPAC MT 185 method.

The viscosity of the compositions is measured at the temperature of 25° C. by using a Brookfield model LVT viscometer according to the CIPAC MT 192 method.

The obtained results are set forth in Table 2A, hereinafter reported:

TABLE 2A

| ANALYTICAL DATA t = 0 | 1 | 2 | 3 | 4 | 5 | 6 | 7 | 8 |
|---|---|---|---|---|---|---|---|---|
| pH | 6.94 | 2.9 | 2.5 | 2.5 | 2.6 | 2.34 | 1.26 | 4.2 |
| Microscope* | regular | regular | regular | regular | regular | regular | regular | regular |
| Residue 100 mesh (%) | 0.01 | 0.01 | 0.01 | 0.01 | 0.01 | 0.01 | 0.01 | 0.01 |
| Residue 325 mesh (%) | 0.1 | 0.1 | 0.1 | 0.1 | 0.1 | 0.1 | 0.1 | 0.1 |
| Viscosity (cPs) | 2130 | 2000 | 2050 | 2000 | 2250 | 1550 | 1450 | 2025 |

NOTES:

*a regular appearance under the microscope indicates a product wherein the crystals are well separated and all substantially with the same form and size.

For each composition obtained according to Example 1B, the following parameters are evaluated:

Macroscopic appearance
viscosity (cPs)
pH
appearance (under microscope)
residue 100 mesh (%)
residue 325 mesh (%)
suspensibility 1% (%)
prothioconazole titre (%)
laser 50% (μm)
laser 90% (μm)
density (g/mL)

The macroscopic appearance of the compositions is evaluated by naked eye, evaluating the possible presence of clear alterations such as, for example, phase separations or sedimentations.

The viscosity, pH, and appearance under the microscope, residue at 100 mesh and 325 mesh, are analyzed as described above.

The parameter defined as "suspensibility 1%" can be determined according to the official CIPAC MT 184 method. In this case, the composition is diluted to 1 wt % with water and kept in a thermostated bath at 20° C. for 30 minutes. The supernatant is removed by suction and the residue on the bottom of the container is dried and weighted. The results obtained indicate the wt % of initial composition which remains in the suspension after dilution. For example, the composition 9 is diluted with water, obtaining a diluted composition wherein the composition 9 is present in an amount of 1 wt % relative to the total weight of the diluted composition. Of this 1%, 95 wt % remains in the suspension after dilution. The parameter "suspensibility 1%" provides information concerning the behavior of the product under dilution. A good suspensibility assures that no product accumulations are present on the bottom of the barrel and that the distribution on the crops is homogeneous.

The prothioconazole titre, expressed as wt % relative to the total weight of the analyzed composition, indicates the actual amount of such compound within the analyzed sample. The prothioconazole titre can be determined by means of per se known methods, e.g. by high-performance chromatography methods.

In particular, the prothioconazole titre can be determined by HPLC.

The parameters indicated as "laser 50%" and "laser 90%" can be measured by passing a laser beam through a sample of the composition to be analyzed, forming a diffraction pattern as a function of the size of the particles contained in the sample, and by providing information on the Gaussian distribution of the particles size in the suspension. The particle size distribution can be measured by using an infrared light Malvern Mastersizer. By means of this instrument the volumetric distribution of the particles in the suspension and the average diameters of the particle fractions corresponding to 50% and 90% of the total volume of the particles, are determined. In particular, the compositions of the invention have been analyzed according to the CIPAC MT 187 method.

The density is measured according to per se known techniques. The density of the compositions can be measured by using a DMA 100M densimeter (Mettler Toledo).

The determination is usually carried out in a thermostated cell at 20° C. In particular, the density of the compositions of the invention has been measured according to the EEC A.3. method.

The obtained results are set forth in Table 2B, hereinafter reported:

TABLE 2B

| ANALYTICAL DATA t = 0 | 9 | 10 |
|---|---|---|
| Macroscopic Appearance* | regular | regular |
| Viscosity (cPs) | 2000 | 1960 |
| pH | 3.0 | 2.74 |
| Microscope** | regular | regular |
| Residue 100 mesh (%) | 0.01 | 0.01 |
| Residue 325 mesh (%) | 0.1 | 0.1 |
| Suspensibility 1% (%) | 95 | 94 |
| Prothioconazole titre (%) | 35.7 | 36 |
| Laser 50% (μm) | 1.9 | 2.3 |
| Laser 90% (μm) | 5.04 | 6.2 |
| Density (g/mL) | 1,155 | 1,151 |

NOTES:
*with "regular" macroscopic appearance it is meant a product in which the mass is fluid and homogeneous without superficial separations or sedimentations.
**a regular aspect under the microscope indicates a product in which the crystals are well separated and all with substantially the same form and size.

In particular, from the results set forth in Tables 2A and 2B, it is possible to observe that all the compositions have a pH<7. In particular, the compositions 2, 3, 4 and 5, each comprising two sulfonate surfactants and one inorganic or organic acid, have a pH between 2.5 and 2.9.

Moreover, all the compositions have a residue 100 mesh of 0.01% and a residue 325 mesh of 0.1%.

Example 3—Evaluation of Parameters after Storing at Room Temperature for 14 Days The products obtained according to the process described above and having the compositions according to Table 1A have been stored for 14 days at room temperature and their following parameters have been evaluated:

Macroscopic appearance
viscosity (cPs)
pH
appearance (under microscope)
residue 100 mesh (%)
residue 325 mesh (%)
suspensibility 1% (%)
prothioconazole titre (%)
chlorothalonil titre (%)
laser 50% (μm)
laser 90% (μm)
density (g/mL)

The macroscopic appearance of the compositions is evaluated by naked eye, evaluating the possible presence of clear alterations such as, for example, phase separations or sedimentations.

The viscosity, pH, and appearance under the microscope, residue at 100 mesh and at 325 mesh, are analyzed as described in Example 2.

The parameter defined as "suspensibility 1%" can be determined according to the official CIPAC MT 184 method. In this case, the composition is diluted to 1 wt % with water and kept in a thermostated bath at 20° C. for 30 minutes. The supernatant is removed by suction and the residue on the bottom of the container is dried and weighted. The results obtained indicate the wt % of initial composition which remains in the suspension after dilution. For example, the composition 1 is diluted with water, obtaining a diluted composition wherein the composition 1 is present in an amount of 1 wt % relative to the total weight of the diluted composition. Of this 1%, 92 wt % remains in the suspension after dilution. The parameter "suspensibility 1%" provides information concerning the behavior of the product under dilution. A good suspensibility assures that no product accumulations are present on the bottom of the barrel and that the distribution on the crops is homogeneous.

The prothioconazole titre and the chlorothalonil titre, which are expressed as wt % relative to the total weight of the analyzed composition, indicate the actual amount of such compounds within the analyzed sample. The prothioconazole and chlorothalonil titres can be determined by means of per se known methods, e.g. by high-performance chromatography methods.

In particular, the chlorothalonil titre has been determined according to the CIPAC 288/SC/M/2, CIPAC Handbook K method.

The prothioconazole titre can be determined by HPLC.

The parameters indicated as "laser 50%" and "laser 90%" can be measured by passing a laser beam through a sample of the composition to be analyzed, forming a diffraction pattern as a function of the size of the particles contained in the sample, and by providing information on the Gaussian distribution of the particles size in the suspension. The particle size distribution can be measured by using an infrared light Malvern Mastersizer. By means of this instrument the volumetric distribution of the particles in the suspension and the average diameters of the particle fractions corresponding to 50% and 90% of the total volume of the particles, are determined. In particular, the compositions of the invention have been analyzed according to the CIPAC MT 187 method.

The density is measured according to per se known techniques. The density of the compositions can be measured by using a DMA 100M densimeter (Mettler Toledo). The determination is usually carried out in a thermostated cell at 20° C. In particular, the density of the compositions of the invention has been measured according to the EEC A.3. method.

The obtained results are set forth in Table 3A, hereinafter:

TABLE 3A

| ANALYTICAL DATA AFTER 14 DAY AMBIENT | | | | | | | | |
|---|---|---|---|---|---|---|---|---|
| | 1 | 2 | 3 | 4 | 5 | 6 | 7 | 8 |
| Macroscopic Appearance* | Regular | regular | regular | regular | regular | non-regular | non-regular | regular |
| Viscosity (cPs) | 1990 | 1810 | 2020 | 1910 | 2080 | 1320 | 1105 | 1810 |
| pH | 4.9 | 2.7 | 2.3 | 2.4 | 2.3 | 2 | 1.4 | 3.3 |
| Microscope** | regular | regular | regular | regular | regular | regular | regular | regular |
| Residue 100 mesh (%) | 0.01 | 0.01 | 0.01 | 0.01 | 0.01 | — | — | — |
| Residue 325 mesh (%) | 0.1 | 0.1 | 0.1 | 0.1 | 0.1 | — | — | — |
| Suspensibility 1% (%) | 92 | 94 | 97 | 92 | 94 | — | — | — |
| Prothioconazole titre (%) | 12.3 | 12.3 | 12.5 | 12.3 | 12.3 | 12.2 | 12.6 | 11.5 |
| Chlorothalonil titre (%) | 28.4 | 28.4 | 28.6 | 28.5 | 28.2 | 28.5 | 28.5 | 28.3 |
| Laser 50% (μm) | 1.36 | 1.71 | 1.73 | 1.77 | 1.48 | — | — | — |
| Laser 90% (μm) | 4.21 | 4.99 | 5.17 | 5.28 | 4.43 | — | — | — |
| Density (g/mL) | 1,237 | 1,236 | 1,242 | 1,235 | 1,237 | — | — | — |

NOTES:

*with "regular" macroscopic appearance it is meant a product in which the mass is fluid and homogeneous without surface separations or sedimentations; on the contrary, where a "not regular" appearance is indicated, it is meant a product which is gelled and/or inhomogeneous and/or having surface separation.

**a "regular" appearance under the microscope indicates a product in which no crystal growth phenomena meant as variation of the crystal morphology and/or formation of agglomerates with respect to the measurements at time 0 are observed.

As can be observed from Table 3A, after 14 days at room temperature, the compositions 6 and 7, wherein no sulfonate surfactant is present, have a non-regular appearance. In particular, such compositions had an inhomogeneous, gelatinous appearance, and phase separation.

On the contrary, the compositions 1-5 and 8, after 14 days of storage at room temperature, retain a regular appearance, in particular homogeneous and without phase separations, substantially unchanged with respect to that found at time 0 (non-specifically set forth in Table 2A).

Example 4—Evaluation of Parameters after Storing at 54° C. for 14 Days

The products obtained according to the above described process and having the compositions according to Table 1A and Table 1B, have been stored for 14 days at 54° C., this way simulating the behavior of the product during its shelf life, i.e. after two years of storage at room temperature.

In particular the following parameters have been evaluated:

- Macroscopic appearance
- viscosity (cPs)
- pH
- appearance (under microscope)
- residue 100 mesh (%)
- residue 325 mesh (%)
- suspensibility 1% (%)
- prothioconazole titre (%)
- prothioconazole degradation (%)
- chlorothalonil titre (%)
- laser 50% (μm)
- laser 90% (μm)

The prothioconazole degradation can be determined by HPLC.

The other parameters considered have been evaluated as described above.

TABLE 4A

ANALYTICAL DATA AFTER 14 DAYS +54° C.

| | 1 | 2 | 3 | 4 | 5 | 6 | 7 | 8 |
|---|---|---|---|---|---|---|---|---|
| Macroscopic appearance* | non-regular | regular | regular | regular | regular | non-regular | non-regular | non-regular |
| Viscosity (cPs) | 5440 | 1780 | 1980 | 1920 | 2090 | 11400 | 15150 | 1025 |
| pH | 2.7 | 2.6 | 2.3 | 2.3 | 2.2 | 1 | 1.2 | 1.5 |
| Microscope** | non-regular | regular | regular | regular | regular | non-regular | non-regular | non-regular |
| Residue 100 mesh (%) | 0.02 | 0.01 | 0.02 | 0.02 | 0.02 | — | — | — |
| Residue 325 mesh (%) | 0.4 | 0.2 | 0.1 | 0.1 | 0.1 | — | — | — |
| Suspensibility 1% (%) | 73 | 94 | 94 | 90 | 94 | — | — | — |
| Prothioconazole titre (%) | 11.8 | 12.2 | 12.5 | 12.3 | 11.9 | 11.3 | 11.7 | 11.4 |
| Prothioconazole degradation (%) | 4.06 | 0.8 | 0 | 0 | 3.25 | 7.4 | 7.14 | 0.9 |
| Chlorothalonil titre (%) | 28.1 | 28.3 | 28.6 | 28.5 | 27.8 | 28.2 | 28.3 | 28.3 |
| Laser 50% (μm) | 3.2 | 1.54 | 1.69 | 1.75 | 1.37 | — | — | — |
| Laser 90% (μm) | 17.3 | 4.68 | 5.11 | 5.26 | 4.23 | — | — | — |

NOTES:

*with "regular" macroscopic appearance it is meant a product in which the mass is fluid and homogeneous without surface separations or sedimentations; on the contrary, where a "not regular" appearance is indicated, it is meant a product which is gelled and/or inhomogeneous and/or having surface separation.

**a "regular" appearance under the microscope indicates a product in which no crystal growth phenomena meant as variation of the crystal morphology and/or formation of agglomerates with respect to the measurements at time 0 are observed.

TABLE 4B

| ANALYTICAL DATA AFTER 14 DAYS +54° C. | | |
|---|---|---|
| | 9 | 10 |
| Macroscopic appearance* | regular | regular |
| Viscosity (cPs) | 1825 | 2050 |
| pH | 2.9 | 2.6 |
| Microscope** | regular | regular |
| Residue 100 mesh (%) | 0.01 | 0.01 |
| Residue 325 mesh (%) | 0.1 | 0.1 |
| Suspensibility 1% (%) | 92 | 92 |
| Prothioconazole titre (%) | 35.7 | 35.5 |
| Prothioconazole degradation (%) | 0 | 1.4 |
| Laser 50% (μm) | 2.09 | 3.6 |
| Laser 90% (μm) | 5.53 | 6 |

NOTES:
*with "regular" macroscopic appearance it is meant a product in which the mass is fluid and homogeneous without superficial separations or sedimentations.
**a "regular" appearance under the microscope indicates a product in which no crystal growth phenomena meant as variation of the crystal morphology and/or formation of agglomerates with respect to the measurements at time 0 are observed.

As can be observed from Table 4A, the compositions 2-5 including at least one organic or inorganic acid and at least one sulfonate surfactant (in this case two sulfonate surfactants) show a good physical stability after storing at 54° C. for 14 days. Indeed, for such compositions the viscosity found at time 0 remains substantially unchanged, and neither crystal growth nor sedimentation or any phase separation is observed.

The same compositions 2-5 show chemical stability as well after storage at 54° C. for 14 days. Indeed, such compositions have a degradation level of prothioconazole between 0% and 3.25%, which results to be acceptable because lower than the threshold value of 5% set forth by FAO Manual (first edition, third revision of 2016) and which does not compromise the applicability and fungicide effectiveness of the composition.

Analogously, as can be seen from Table 4B, the compositions 9, 10, which include at least one organic or inorganic acid and at least one sulfonate surfactant (in this case three sulfonate surfactants) show a good physical stability after storage at 54° C. for 14 days. Indeed, also in these cases neither crystal growth, nor sedimentation or phase separation is observed.

The same compositions 9 and 10 show chemical stability as well after storage at 54° C. for 14 days. Indeed, such compositions have a degradation level of prothioconazole between 0% and 1.4%, which results to be acceptable because lower than the threshold value of 5% set forth by FAO Manual (first edition, third revision of 2016) and which does not compromise the applicability and fungicide effectiveness of the composition.

The invention claimed is:

1. An aqueous composition comprising prothioconazole, and at least one sulfonate surfactant, said composition having a pH between 2 and 3.5, said composition further comprising at least one acid selected from sulfuric acid, phosphoric acid, hydrochloric acid, citric acid and mixture thereof, wherein said at least one sulfonate surfactant is a mixture comprising methylnaphthalenesulfate surfactant and lignosulfonate surfactant, wherein the total amount by weight of sulfonate surfactants is from 2% to 15%.

2. The composition according to claim 1, wherein the amount by weight of said prothioconazole is between 1% and 50.

3. The composition according to claim 1, wherein the amount by weight of said at least one sulfonate surfactant is between 4% and 10%.

4. The composition according to claim 1, wherein the concentration of said prothioconazole is between 10 g/l and 600 g/l.

5. The composition according to claim 1, said composition being an aqueous suspension concentrate (SC).

6. The composition according to claim 1, further comprising one or more antifreezes, or one or more dispersants, or one or more defoamers, or one or more biocide agents, or one or more thickeners.

7. A process for the preparation of a composition according to claim 1, comprising a step of mixing prothioconazole- and at least one sulfonate surfactant, in water.

8. The process according to claim 7, further comprising a step of adding at least one acid selected from inorganic acids, organic acids and mixtures thereof.

9. The process according to claim 7, further comprising a step of micronizing said composition.

10. The composition according to claim 1, further comprising chlorothalonil.

11. The process according to claim 7, further comprising a step of mixing chlorothanil.

12. The composition according to claim 10, wherein the amount by weight of said chlorothalonil is between 1% and 55%.

13. The composition according to claim 10, wherein the concentration of said chlorothalonil is between 100 g/l and 700 g/l.

* * * * *